US012656626B2

(12) United States Patent
Chen

(10) Patent No.: US 12,656,626 B2
(45) Date of Patent: Jun. 16, 2026

(54) GLASSES STRUCTURE

(71) Applicant: ARGUS VISION INTERNATIONAL LIMITED, Tainan (TW)

(72) Inventor: Lin-Yun Chen, Tainan (TW)

( * ) Notice: Subject to any disclaimer, the term of this patent is extended or adjusted under 35 U.S.C. 154(b) by 287 days.

(21) Appl. No.: 18/637,478

(22) Filed: Apr. 17, 2024

(65) Prior Publication Data

US 2024/0369852 A1 Nov. 7, 2024

(30) Foreign Application Priority Data

May 4, 2023 (TW) .................................. 112116613

(51) Int. Cl.
G02C 1/00 (2006.01)
G02C 1/08 (2006.01)
(52) U.S. Cl.
CPC .................. G02C 1/08 (2013.01); G02C 1/10 (2013.01); *G02C 2200/04* (2013.01)
(58) Field of Classification Search
CPC ........ G02C 1/08; G02C 1/10; G02C 2200/04; G02C 2200/06; G02C 2200/08
See application file for complete search history.

(56) References Cited

U.S. PATENT DOCUMENTS 10,345,616 B2 * 7/2019 Chou ........................ G02C 1/08
11,880,092 B2 * 1/2024 Chen ........................ G02C 5/04

* cited by examiner

*Primary Examiner* — Tuyen Tra
(74) *Attorney, Agent, or Firm* — BruceStone LLP; Joseph A. Bruce

(57) ABSTRACT

Provided is a glasses structure, including an upper frame, a lower frame and a lens. The upper frame is provided with a coupling seat downwardly. The coupling seat has a slide groove running through both sides. The slide groove has a snap-in position and a release position. A notch is provided between the snap-in position and the release position. The lower frame is upwardly provided with two extension arms. a guide bar is provided between the two extension arms in the slide groove. The upper frame and the lower frame are clamped to the lens by operating the guide bar in the snap-in position. Alternatively, by operating the guide bar in the release position, the lower frame is relatively far away from the upper frame to removing and replacing the lens.

10 Claims, 13 Drawing Sheets

GLASSES STRUCTURE

BACKGROUND OF THE INVENTION

1. Field of the Invention

The present invention relates to a pair of glasses, and particularly a glasses structure in which the upper and lower frames can be separated or combined without the aid of tools and in which the lenses can be replaced.

2. The Prior Arts

Nowadays, eyeglasses can correct all kinds of vision problems, including myopia, hyperopia, astigmatism, presbyopia or strabismus, etc. There are also other kinds of eyeglasses, including goggles, sunglasses, sports glasses, etc., which provide various kinds of protection for the eyes, and allow the consumers to choose to wear them for different occasions. As such, consumers nowadays usually have multiple pairs of glasses with different functions to facilitate replacement of the situation. However, the above situation also creates an economic burden for consumers and the problem of storage of glasses.

Therefore, replaceable lenses have been created. The main structure of the lenses is to set up a concave-convex snap structure between the periphery of the lenses and the periphery of the frames such that the consumers can disassemble and the lenses and replace them by themselves, and re-snap them onto the frames. Accordingly, the lenses can be replaced to cope with different occasions. The above structure is commonly found in half-frame spectacles, and the snap structure of half-frame spectacles can only be limited to the periphery of the half-frame, but not to the full circumference of the lenses. When the lens is impacted, it will be easily detached from the half-frame. In addition, with full-framed frames, it is often necessary to use tools to detach the lenses from the frames. This is quite inconvenient for consumers.

SUMMARY OF THE INVENTION

In view of the shortcomings and deficiencies of the prior art, the present disclosure provides a pair of glasses in which the upper and lower frames can be separated or combined without the use of tools, so as to strengthen the structure of the lenses assembled in the frames, and at the same time to enhance the convenience of replacing the lenses.

In order to achieve the above purpose, the technical means employed in the present disclosure is a glasses structure, in which a side facing a face of a wearer is defined as an inner surface and a side facing an outside is defined as an outer surface, the glasses structure comprising: an upper frame provided with an upper lens groove at a bottom edge thereof, wherein the upper frame is provided with a coupling seat downwardly at a middle section of the upper frame, the coupling seat has a slide groove, the slide groove is in a form of a long strip running from top to bottom through both sides of the coupling seat, the slide groove has a snap-in position and a release position, a notch is provided in a wall of the slide groove between the snap-in position and the release position, and the notch extends through the coupling seat; a lower frame provided with a lower lens groove at a top edge thereof, wherein the lower frame is provided with two extension arms upwardly at a middle section of the lower frame, a channel is provided between the two extension arms, a guide bar is coupled between two extension arms adjacent to a top of the channel, and the lower frame is provided with the guide bar separable from the notch in the upper frame into the slide groove and operable to move between the snap-in position and the release position; and a lens disposed between the upper frame and the lower frame, wherein a top edge of the lens is provided in the upper lens groove and a bottom edge of the lens is provided in the lower lens groove, wherein when the guide bar is operated to move to the snap-in position, the lower frame and the upper frame are relatively close to each other such that the upper frame and the lower frame clamp the lens; and when the guide bar is operated to move from the snap-in position to the release position, the lower frame and the upper frame are relatively far away from each other such that the lens is detached from the upper lens groove and the lower lens groove.

By means of the above structure, the upper frame and the lower frame are wrapped around the top and bottom edges of the lens to strengthen its combination structure, and to enable the present disclosure to easily replace the lens without the assistance of tools by moving the upper frame and the lower frame to the release position.

DETAILED DESCRIPTION OF THE PREFERRED EMBODIMENT

Figure 1:
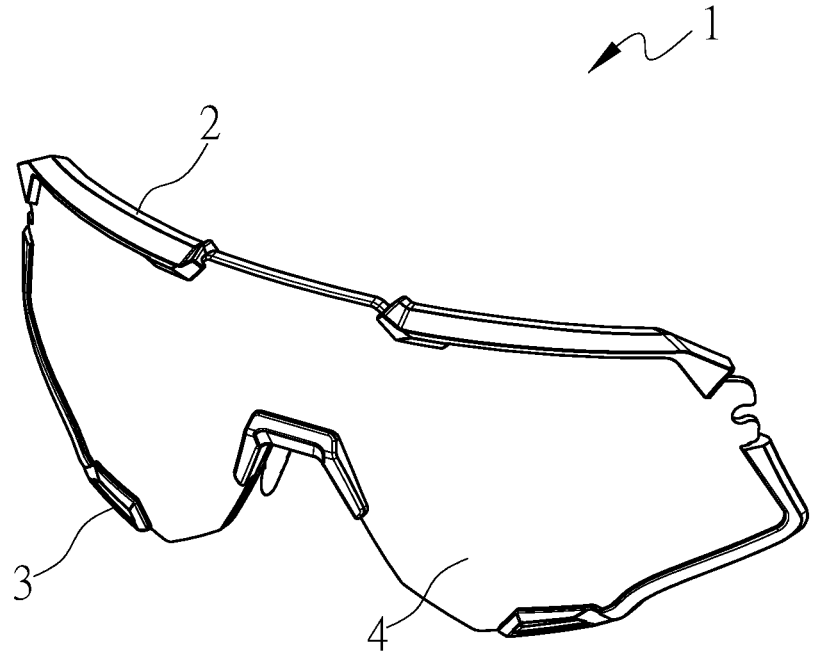
FIG. 1 is a three-dimensional schematic diagram showing a glasses structure of the present disclosure.

The following is a specific embodiment to illustrate the implementation of the present disclosure. Persons skilled in the art can easily understand the other advantages and effects of the present disclosure from the disclosure in the specification.

Referring to FIG. 1 to FIG. 4, a glasses structure is provided according to a preferred embodiment of the present disclosure, in which a side facing a face of a wearer is defined as an inner surface and a side facing an outside is defined as an outer surface. The glasses structure 1 mainly includes: an upper frame 2, a lower frame 3, and a lens 4, wherein the glasses 1 may be, for example, sunglasses, work glasses, sports eyewear, glasses for vision correction, etc. The present disclosure does not limit the material of the upper frame 2 and the lower frame 3, which are preferably plastic.

In an embodiment, the upper frame 2 is provided with an upper lens groove 21 recessed at the bottom edge, and the upper frame 2. The upper frame 2 is provided with a coupling seat 22 extending integrally downwardly at the middle section of the upper frame 2. The coupling seat 22 has a slide groove 23, which is in the form of an elongated strip from top to bottom and runs through both sides of the coupling seat 22. The slide groove 23 has a snap-in position 231 and a release position 231. The snap-in position 231 is located in the upper portion of the slide groove 23. The release position 232 is located in the lower portion of the slide groove 23. A notch 24 is provided in a wall of the slide groove 23 between the snap-in position 231 and the release position 232, and the notch 24 extends through the coupling seat. In an embodiment, the notch 24 is directed towards the inner surface of the lens 1 and is open at both ends such that the slide groove 23 is connected to the outside through the notch 24. In addition, the slide groove 23 is provided with a protrusion 233 on a wall adjacent to the snap-in position 231, and the protrusion 233 causes the slide groove 23 to partially form a narrow neck section N, that is to say, the width W1 of the narrow neck section N is smaller than the width W2 of the slide groove 23.

Figure 6:
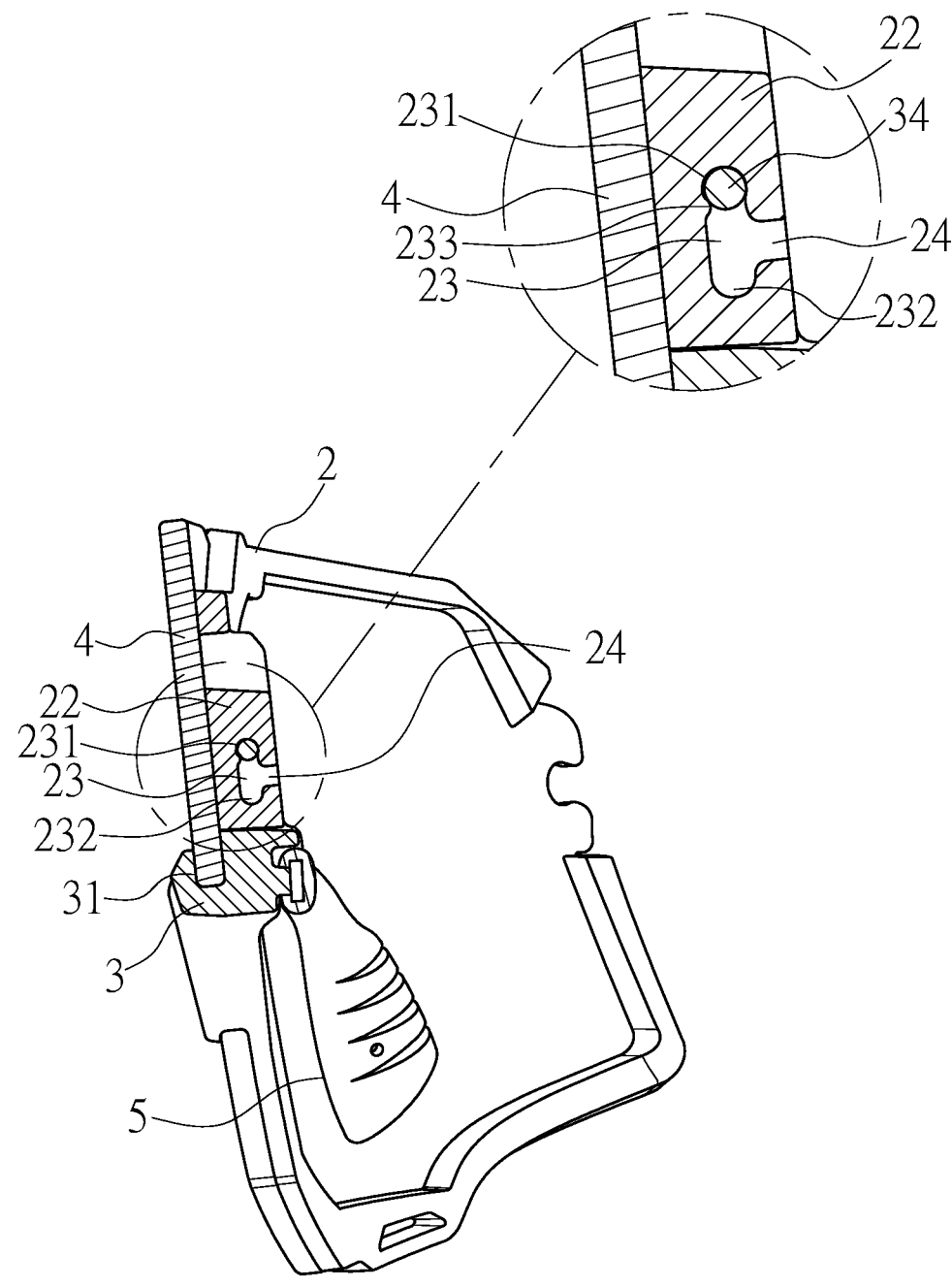
Figure 7:
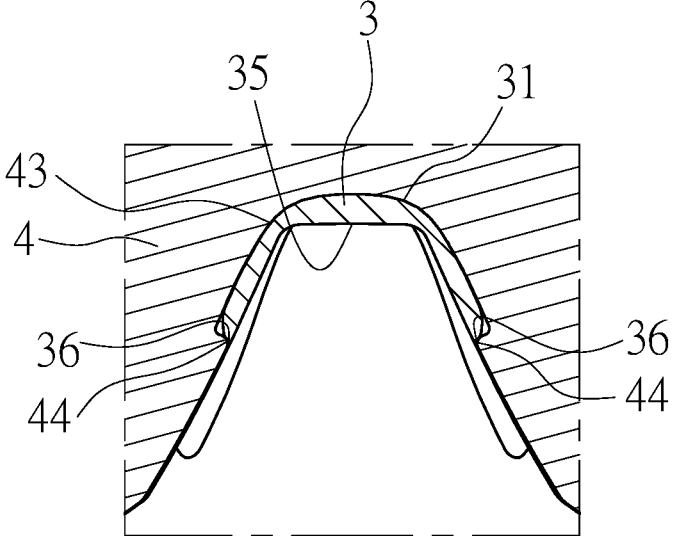
FIG. 7 is a partial cross-sectional schematic diagram showing an embodiment according to the present disclosure.

The top edge of the lower frame 3 is concavely provided with a lower lens groove 31, and two opposing extension arms 32 are integrally extended upwardly in the middle section of the lower frame 3. A channel 33 is formed between the two extension arms 32, and a guide bar 34 is provided adjacent to the top of the channel 33 to connect between the two extension arms 32. In an embodiment, the guide bar 34 is in the shape of a cylinder, and the outer diameter D thereof is slightly larger than the width W3 of the notch 24, so as to allow the lower frame 3 to be elastically forced into the notch 24 of the upper frame 2 with the material of the guide bar 34, into the slide groove 23, and to operatively operate the guide bar 34 between the snap-in position 231 and the release position 232, and not to be easily detached. Alternatively, the guide bar 34 is operatively detached from the notch 24 for replacing the lower frame 3 or the upper frame 2. While the lower frame 3 is assembled in the upper frame 2, the two extension arms 32 are located on both sides of the coupling seat 22. Referring to FIG. 6 and FIG. 7, the lower frame 3 has a tapered concave portion 35 in the middle section of the lower frame 3. A shoulder 36 is provided in the lower lens groove 31 opposite to the two opposite groove walls of the concave portion 35. A nosepiece 5 is screwed to the middle section of the inner surface of the lower frame 3.

In an embodiment, the lens 4 may be a one-piece lens, but not limited thereto. The lens 4 may also be a two-piece lens with a link in the middle. The present disclosure does not limit the type of the lens 4, which may be one of a prescription lens, a sunshade lens, a goggle lens, or a color-changing lens. The lens 4 is arranged between the upper frame 2 and the lower frame 3, and the top edge 41 of the lens 4 is embedded in the upper lens groove 21, and the bottom edge 42 of the lens 4 is embedded in the lower lens groove 31. The bottom edge 42 of the lens 4 is formed with a tapering groove 43 in the middle section of the bottom edge 42 of the lens 4. As shown in FIG. 7, the two opposite grooves of the groove 43 are respectively projected with a buckle. As shown in FIG. 7, a buckle 44 is projected on each of the two opposite walls of the groove 43. When the lens 4 is assembled in the lower lens groove 31, each of the buckles 44 is correspondingly fastened under the shoulder 36 to further secure the lens to the lower frame 3. It should be noted that in this embodiment, as shown in FIG. 5 and FIG. 6, the lens 4 can only be assembled in the upper lens groove 21 and the lower lens groove 31 when the upper frame 2 and the lower frame 3 are combined and the guide bar 34 is in the release position 232.

Figure 4:
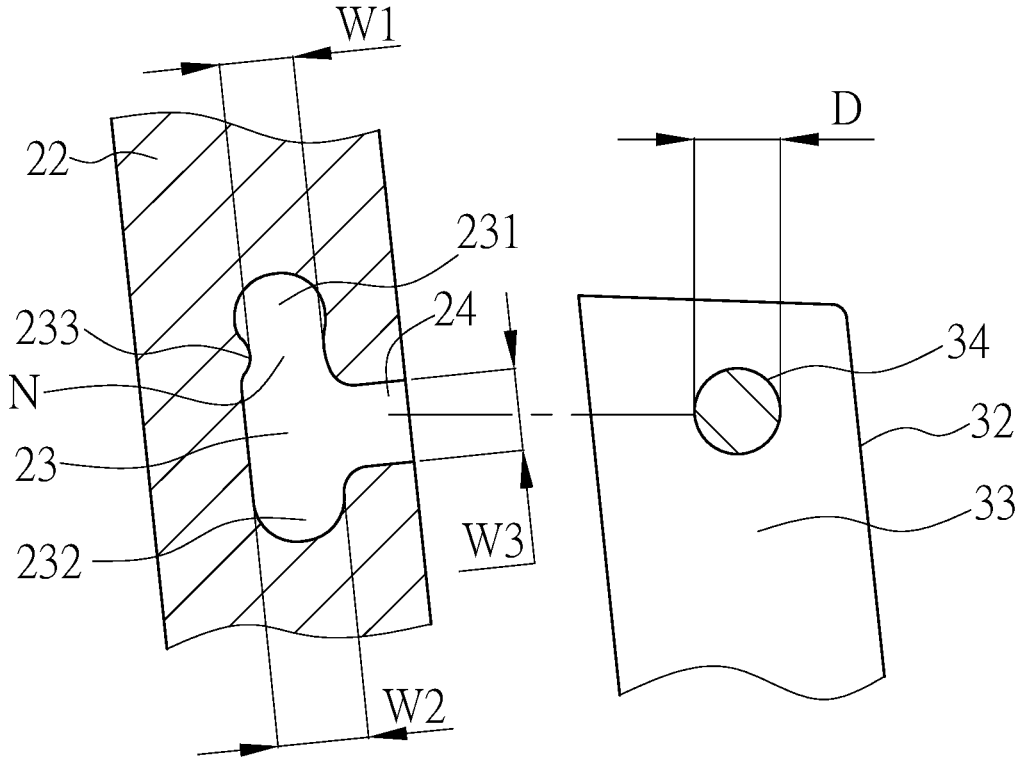
FIG. 4 is a cross-sectional schematic diagram showing a slide groove and a guide bar according to the present disclosure.
Figure 5:
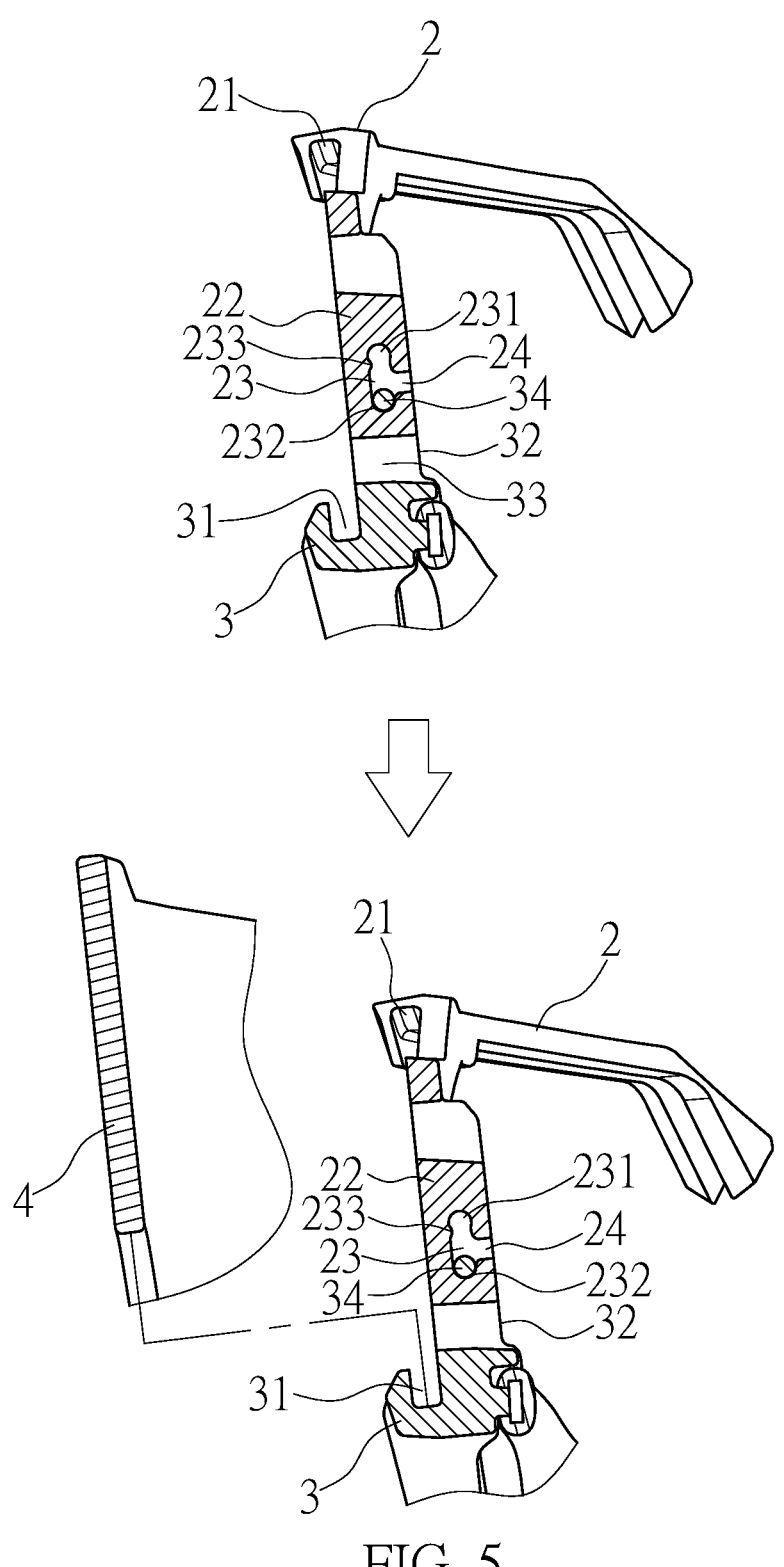
FIG. 5 and FIG. 6 are cross-sectional schematic diagrams showing the continuous combination according to the present disclosure.

As shown in FIG. 4 to FIG. 6, when the upper frame 2 and the lower frame 3 are operated to enable the guide bar 34 to be moved and forced into the narrow neck section N and to be fixed at the snap-in position 231, the distance between the lower frame 3 and the upper frame 2 is relatively close such that the upper frame 2 and the lower frame 3 form a state of clamping the lens 4. Conversely, when the upper frame 2 and the lower frame 3 are operated to enable the guide bar 34 to be moved from the snap-in position 231 to the release position 232, the distance between the lower frame 3 and the upper frame 2 will be relatively far away from each other such that the lens 4 can be detached from the upper lens groove 21 and the lower lens groove 31 for lens replacement.

Figure 2:
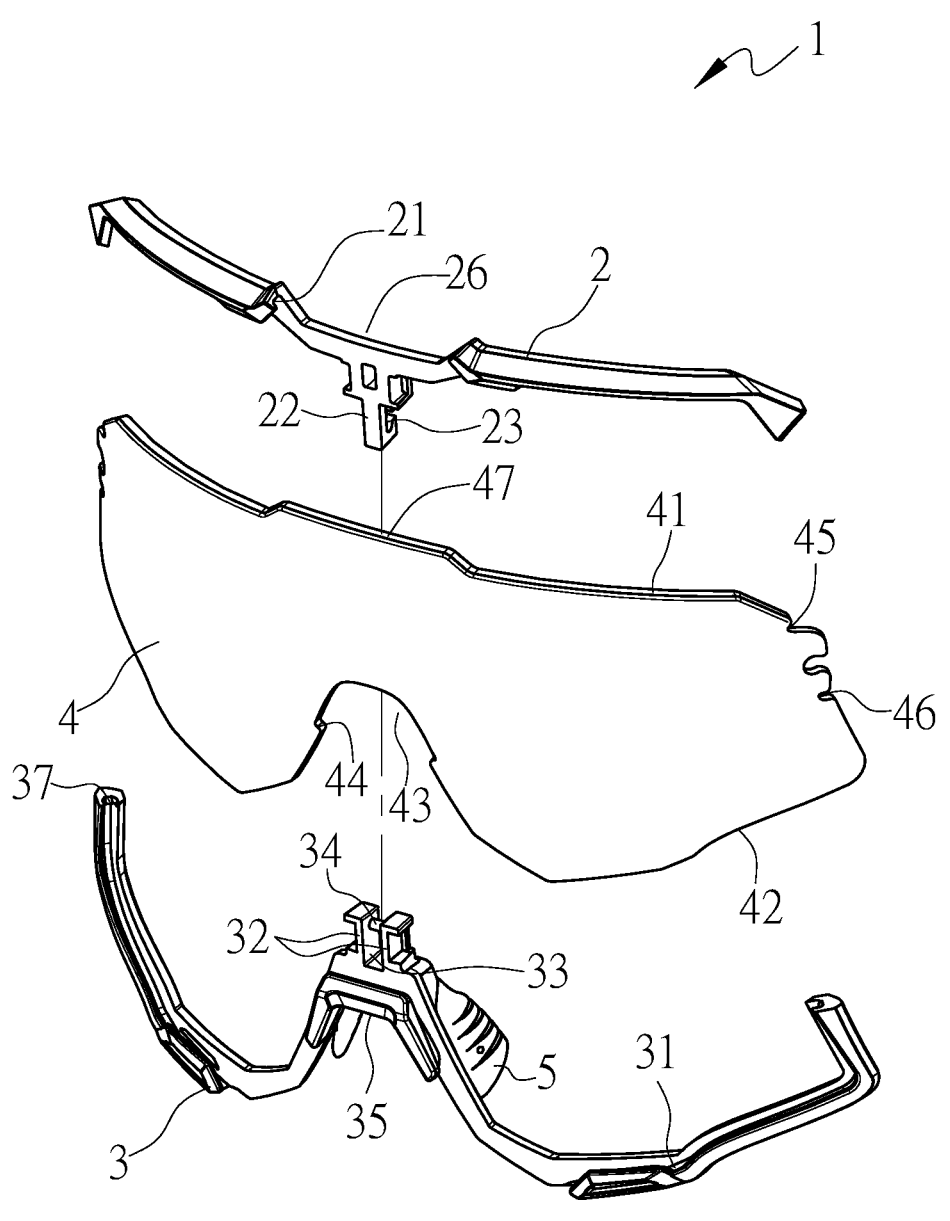
FIG. 2 is a three-dimensional schematic diagram showing the front view of the glasses structure of the present disclosure.
Figure 3:
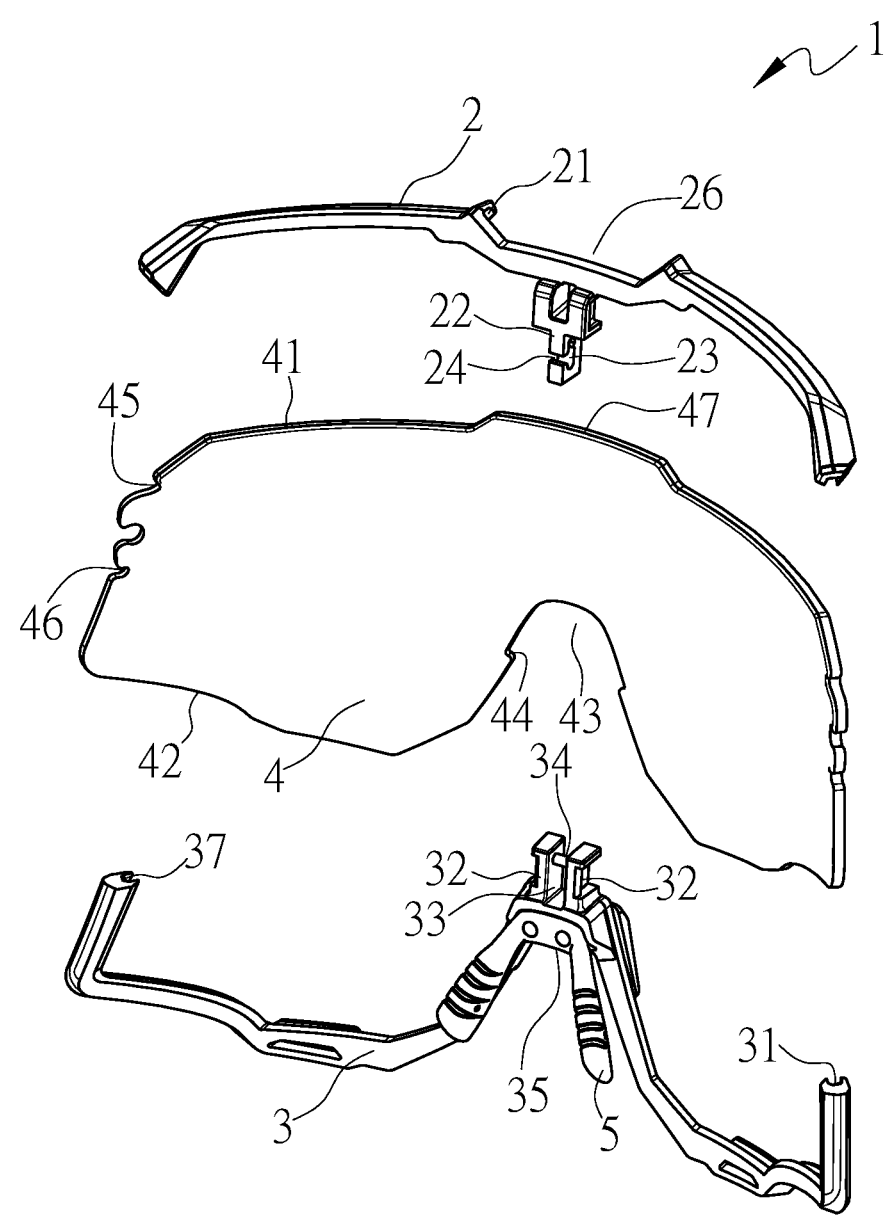
FIG. 3 is a three-dimensional schematic diagram showing the rear view of the glasses structure of the present disclosure.
Figure 10:
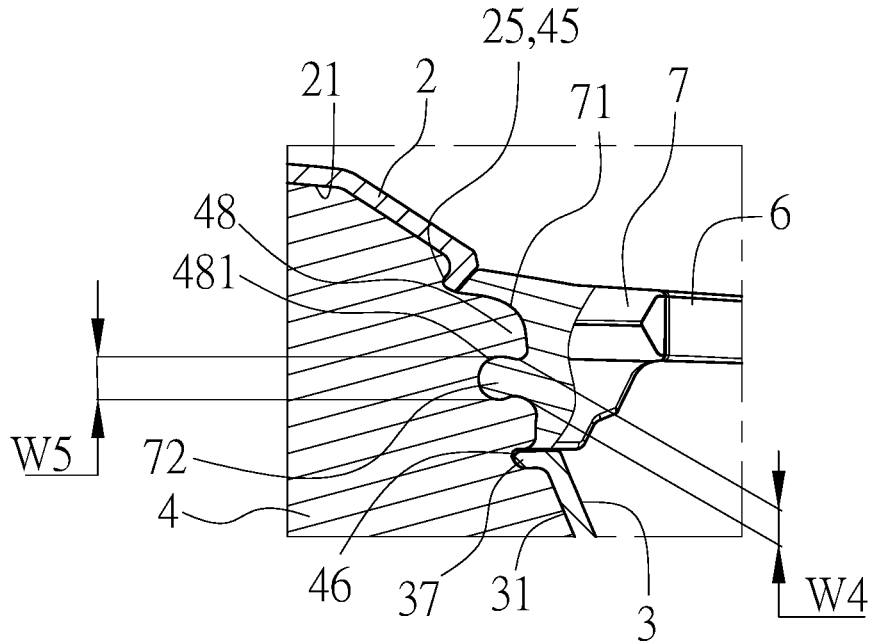
FIG. 10 is a partial cross-sectional schematic diagram showing an embodiment according to the present disclosure.

Referring to FIG. 2, FIG. 3 and FIG. 10, in order FOR the upper frame 2 and the lower frame 3 to be securely combined with the lens 4, a first insertion portion 25 is protruding from both ends of the upper lens groove 21 of the upper frame 2. The lower frame 3 has a second insertion portion 37 protruding from both ends of the lower lens groove 31 of the lower frame 3. The two outer sides of the lens 4 are respectively provided with a first insertion groove 45 and a second insertion groove 46 that are spaced apart at the top and bottom and shaped to match each of the first insertion portion 25 and each of the second insertion portion 37. When the guide bar 34 of the lower frame 3 is in the snap-in position 231, the first insertion portion 25 at both ends of the upper frame 2 is detachably embedded in the first insertion groove 45, and the second insertion portion 37 at both ends of the lower frame 3 is detachably embedded in the second insertion groove 46 such that the top edge 41 and the bottom edge 42 of the lens 4 are subjected to the upper frame 2 and the lower frame 3 respectively to strengthen the combination structure.

In addition, the upper frame 2 is provided with a positioning groove 26 in the middle section of the upper frame 2, and the top edge 41 of the lens 4 is convexly provided with a positioning portion 47. When the top edge 41 of the lens 4 is assembled in the upper lens groove 21, the positioning portion 47 is inserted in the positioning groove 26, thereby limiting the lateral displacement of the lens 4 with respect to the upper frame 2.

Figure 8:
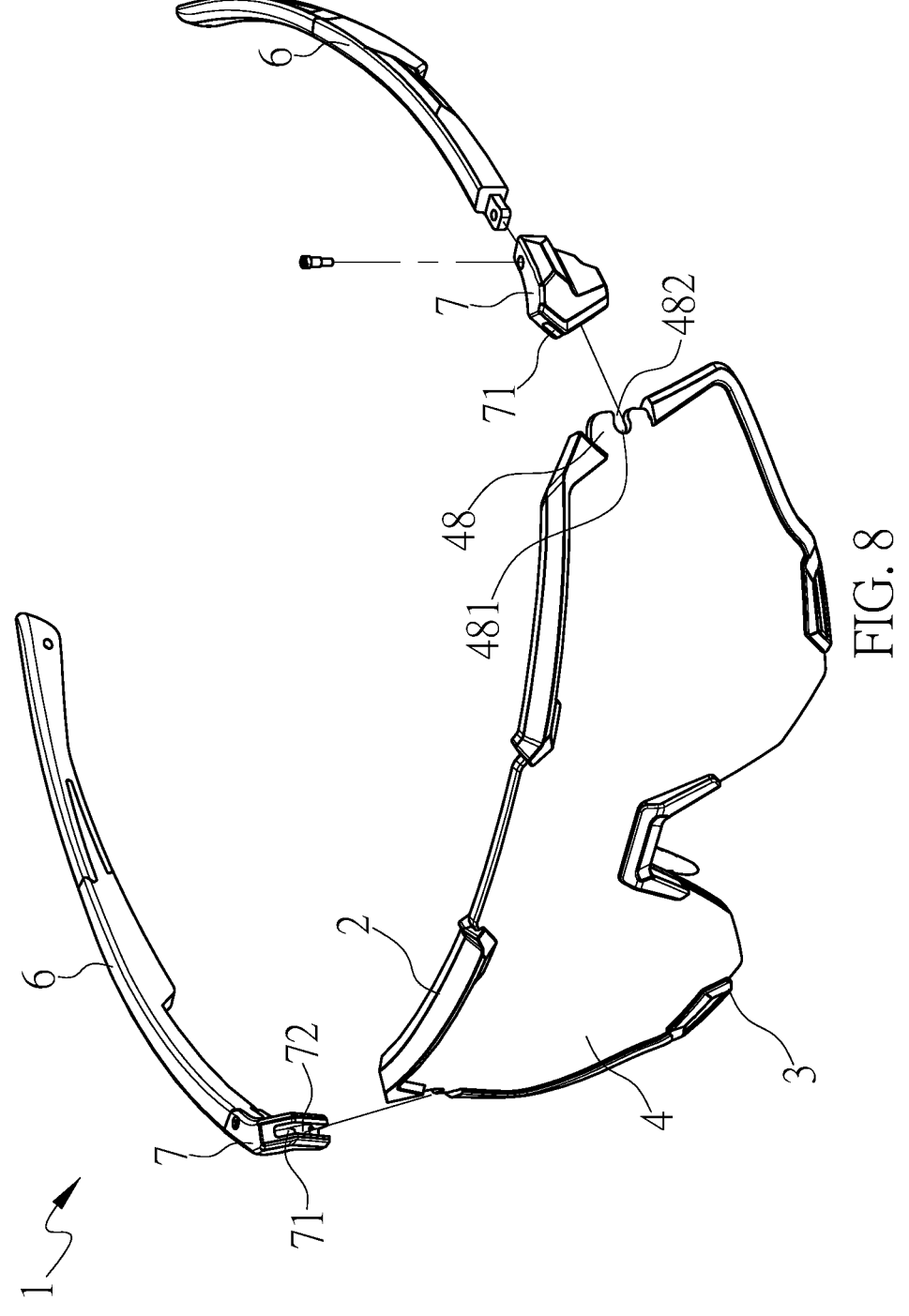
FIG. 8 is a three-dimensional schematic diagram showing the decomposition of the glasses structure according to an embodiment of the present disclosure.
Figure 9:
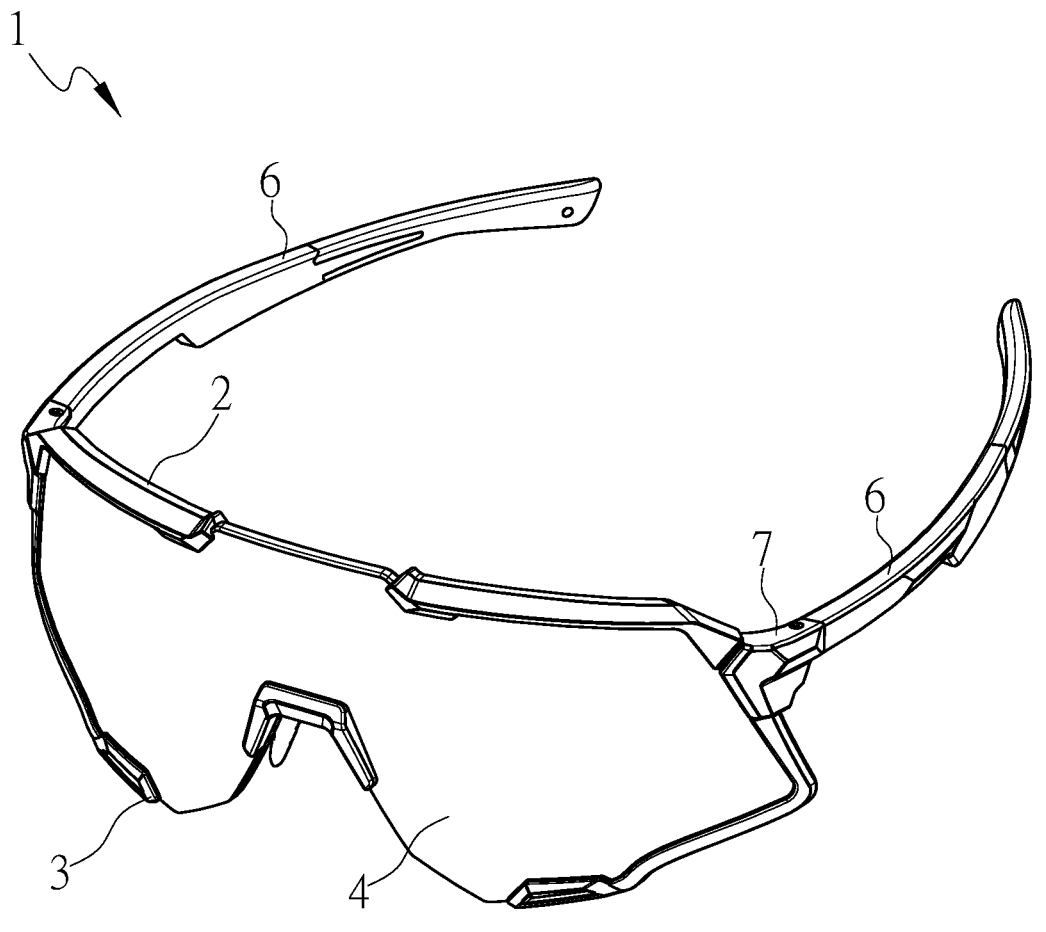
FIG. 9 is a three-dimensional schematic diagram showing FIG. 8 according to one embodiment of the present disclosure.

Continuing with reference to FIG. 8 and FIG. 10, the glasses 1 includes two temples 6. The front end of each of the temples 6 is pivoted to a pivot seat 7 such that the temples 6 can be folded or unfolded against the pivot seat 7. The pivot seat 7 is provided with a cutting slot 71 on the side the pivot seat 7 back to the temple 6, and the cutting slot 71 is internally convexly provided with a third insertion portion 72. The lens 4 is provided with a connection ear 48 protruding from each side of the lens 4. The connection ear 48 is located between the first insertion groove 45 and the second insertion groove 46. The connection ear 48 is shaped to match the shape of the cutting slot 71, and the connection ear 48 is provided with a third insertion groove 481 penetrating the lens 4. The third insertion groove 481 is provided with an opening 482 on the side facing the connection ear 48. The width W4 of the opening 482 is smaller than the width W5 of the third insertion portion 72 so as to allow the temple 6 to be detachably forced into the opening 482 by the third insertion portion 72 to be embedded into the third insertion groove 481. The connection ear 48 of the lens 4 is correspondingly embedded in the cutting slot 71, and the temple 6 is bonded to the lens 4.

Figure 11:
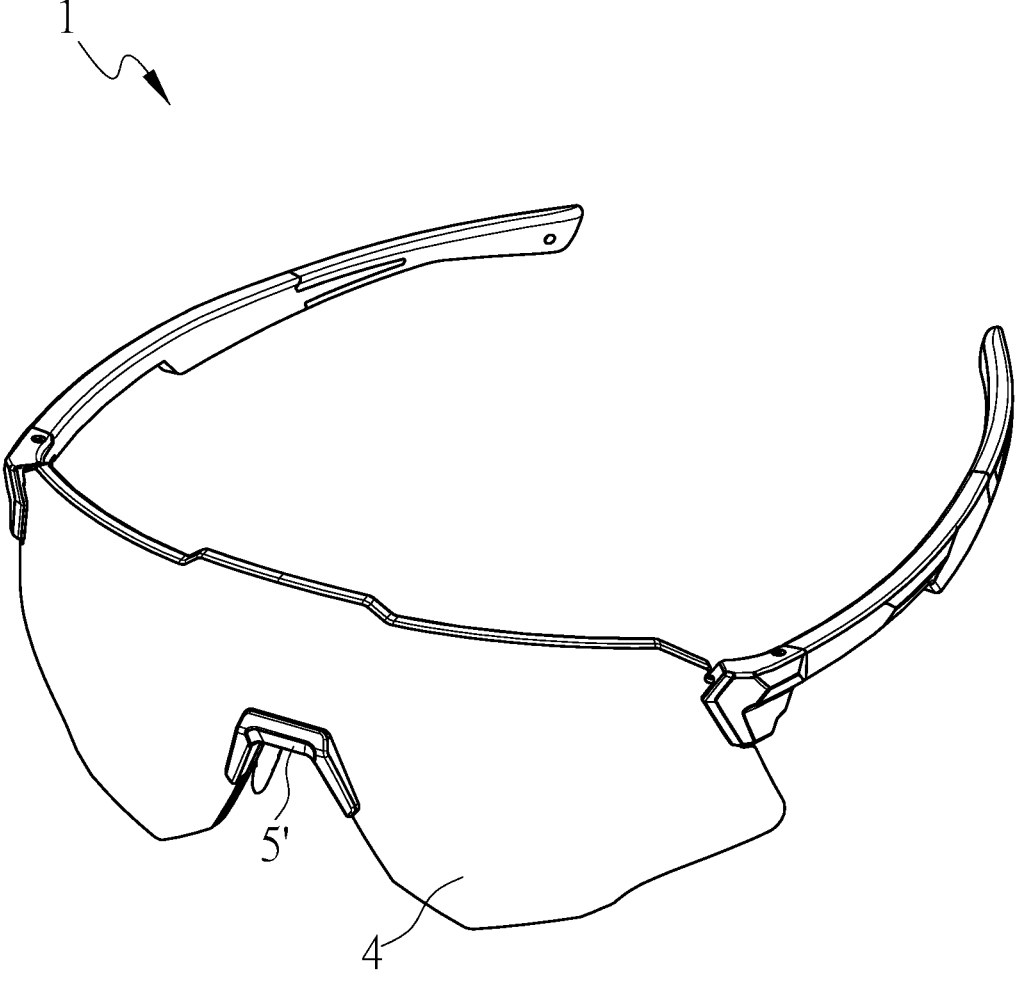
FIG. 11 is a three-dimensional schematic diagram showing an unframed glasses structure according one embodiment of the present disclosure.

It is worth mentioning that in the present disclosure, in addition to the possibility of replacing the lens, as shown in FIG. 11, since the temples 6 are bonded to the lens 4, the glasses 1 can be used without assembling the upper frame 2 and the lower frame 3, thereby forming the glasses 1 in a rimless state. However, the present embodiment requires a nosepiece 5' to be provided in the tapering groove 43 in the middle section of the lens 4. In addition, because there are no frame constraints, the wearer's field of vision is also wider, and the weight of the glasses 1 can be reduced, thereby reducing the effect of pressure on the nose bridge. Additionally, the lens 4 may also no longer be limited to the shape of the upper frame 2 and the lower frame 3 such that it can be replaced with lenses of different contour shapes.

Figure 12:
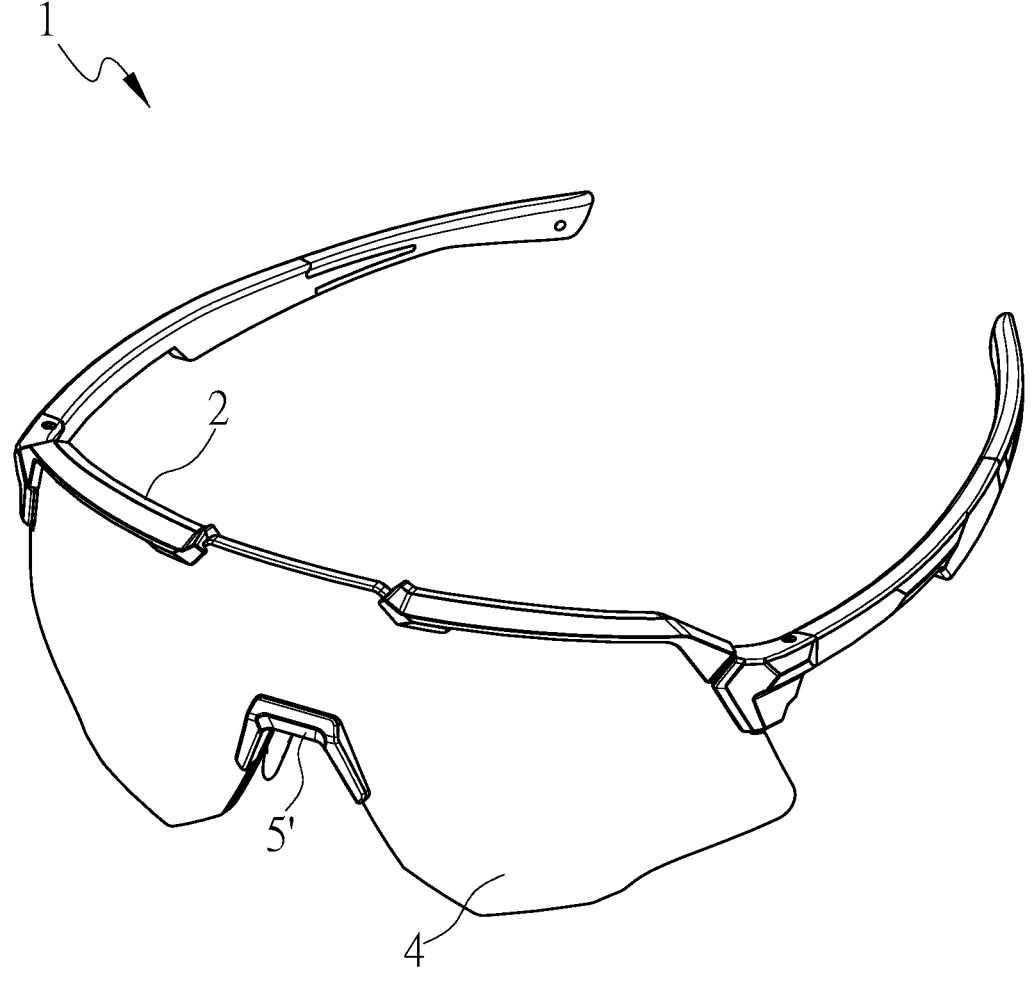
FIG. 12 and FIG. 13 are three-dimensional schematic diagrams showing semi-framed glasses structures according embodiments of the present disclosure.
Figure 13:
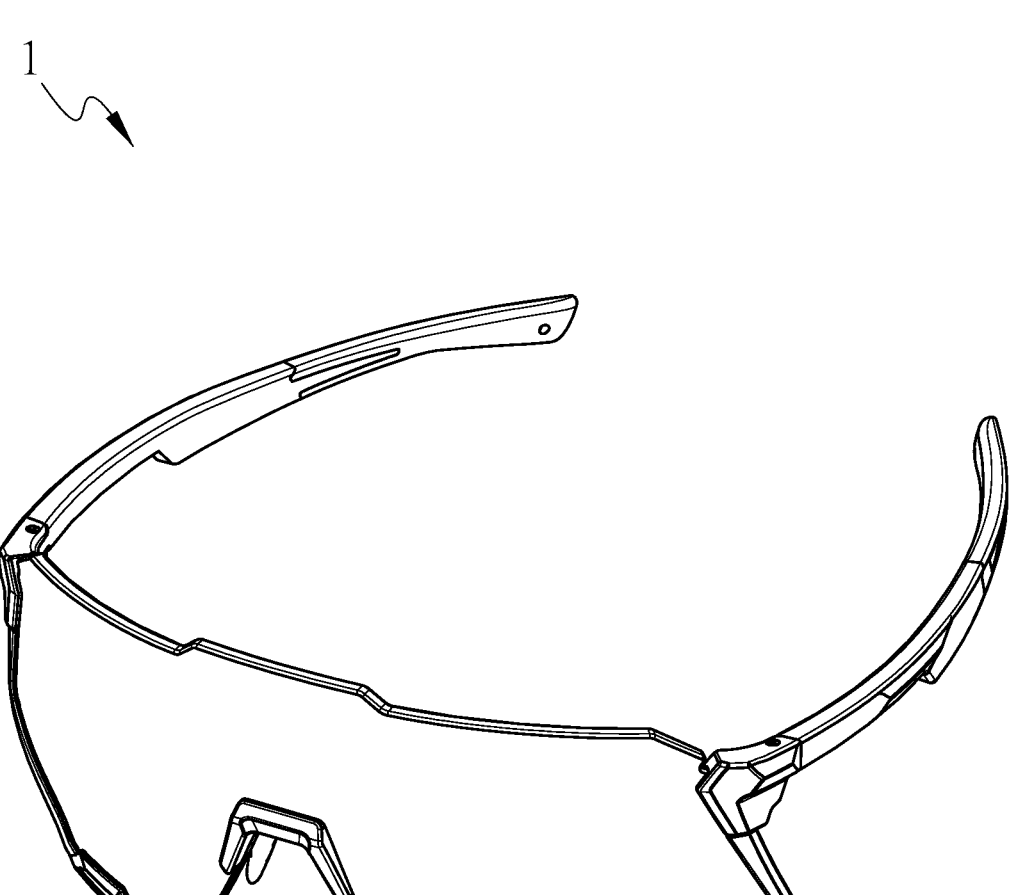

Continuing to refer to FIG. 12, the glasses 1 can be used in a state in which the lower frame 3 is not assembled to form a half-rimmed eyewear pattern with the upper frame 2 such that the glasses 1 as a whole has a visual effect different from that of a full-rimmed eyewear. In addition, as shown in FIG. 13, the glasses 1 can also be used in a state in which the upper frame 2 the upper frame 2 is not assembled to form a half-rimmed eyewear pattern having a lower frame 3. Moreover, in addition to replacing the lens, the present disclosure can also be changed into different patterns, or different colors and shapes of the upper frame 2, the lower frame 3 in order to enhance the product diversification and market competitiveness.

However, the above-mentioned embodiments are only illustrative to illustrate the effects of the present disclosure, and are not intended to limit the present disclosure. Those skilled in the art can make modifications and changes to the aforesaid embodiments without departing from the spirit and scope of the present disclosure. In addition, the numbers of elements in the above-mentioned embodiments are only for illustrative purposes, and are not intended to limit the present disclosure. Therefore, the scope of protection of rights of the present disclosure should be listed in the claims of the present disclosure below.

What is claimed is:

1. A glasses structure, in which a side facing a face of a wearer is defined as an inner surface and a side facing an outside is defined as an outer surface, the glasses structure comprising:

an upper frame provided with an upper lens groove at a bottom edge thereof, wherein the upper frame is provided with a coupling seat downwardly at a middle section of the upper frame, the coupling seat has a slide groove, the slide groove is in a form of a long strip running from top to bottom through both sides of the coupling seat, the slide groove has a snap-in position and a release position, a notch is provided in a wall of the slide groove between the snap-in position and the release position, and the notch extends through the coupling seat;

a lower frame provided with a lower lens groove at a top edge thereof, wherein the lower frame is provided with two extension arms upwardly at a middle section of the lower frame, a channel is provided between the two extension arms, a guide bar is coupled between two extension arms adjacent to a top of the channel, and the lower frame is provided with the guide bar separable from the notch in the upper frame into the slide groove and operable to move between the snap-in position and the release position; and a lens disposed between the upper frame and the lower frame, wherein a top edge of the lens is provided in the upper lens groove and a bottom edge of the lens is provided in the lower lens groove, wherein when the guide bar is operated to move to the snap-in position, the lower frame and the upper frame are relatively close to each other such that the upper frame and the lower frame clamp the lens; and when the guide bar is operated to move from the snap-in position to the release position, the lower frame and the upper frame are relatively far away from each other such that the lens is detached from the upper lens groove and the lower lens groove.

2. The glasses structure of claim 1, wherein under the lower frame assembled with the upper frame, the two extension arms are located on both sides of the coupling seat, the slide groove is provided with a protrusion on a wall adjacent to the snap-in position, and the protrusion causes the slide groove to be partially formed in to a narrow neck section such that the guide bar, after being forced into the narrow neck section, is secured in the snap-in position.

3. The glasses structure of claim 1, wherein an outer diameter of the guide bar is larger than a width of the notch, and the guide bar is elastically forced into the notch by its material.

4. The glasses structure of claim 1, wherein a first insertion groove is provided on each side of the lens, a first insertion portion is provided at each end of the upper lens groove, and the first insertion portion is detachably embedded in the first insertion groove.

5. The glasses structure of claim 1, wherein a second insertion groove is provided on each side of the lens, and a second insertion portion is provided at each end of the lower lens groove, and the second insertion portion is detachably embedded in the second insertion groove.

6. The glasses structure of claim 1, wherein the bottom edge of the lens has a tapering groove in the middle section, two opposing groove walls of the tapering groove are respectively convex with a buckle, the lower frame is tapered to the bottom edge of the lens, the lower lens groove is provided with two opposing shoulders, and when the lens is assembled in the lower lens groove, each buckle is correspondingly fastened under each shoulder.

7. The glasses structure of claim 1, further comprising: two temples, wherein a pivot seat is provided at one end of each of the temples, one side of the pivot seat is provided with a slot, a third insertion portion is provided in the slot, the lens has a connection ear protruding from each side of the lens, the connection ear match a shape of the slot, the connection ear is provided with a third insertion groove, each of the temples is detachably embedded in a third insertion groove with the third insertion portion, and the connection ear of the lens is inserted into the groove.

8. The glasses structure of claim 1, wherein a nosepiece is provided at a center of an inner surface of the lower frame.

9. The glasses structure of claim 1, wherein the top edge of the lens is convexly provided with a positioning portion, the upper frame is provided with a positioning slot, and when the lens is assembled in the upper frame, the positioning portion is inserted in the positioning slot.

10. The glasses structure of claim 1, wherein the lens is one of the prescription lenses or sunglasses or eye protection lenses.

\* \* \* \* \*